(12) United States Patent
Jung et al.

(10) Patent No.: US 9,819,934 B2
(45) Date of Patent: Nov. 14, 2017

(54) METHODS AND DEVICES FOR ENCODING AND DECODING AT LEAST ONE IMAGE IMPLEMENTING A SELECTION OF PIXELS TO BE PREDICTED, AND CORRESPONDING COMPUTER PROGRAM

(75) Inventors: Joel Jung, Le Mesnil Saint Denis (FR); Jean-Marc Thiesse, Saint-Cloud (FR); Stephane Pateux, Rennes (FR)

(73) Assignee: ORANGE, Paris (FR)

( * ) Notice: Subject to any disclaimer, the term of this patent is extended or adjusted under 35 U.S.C. 154(b) by 896 days.

(21) Appl. No.: 13/995,026

(22) PCT Filed: Dec. 9, 2011

(86) PCT No.: PCT/FR2011/052928
§ 371 (c)(1),
(2), (4) Date: Jun. 17, 2013

(87) PCT Pub. No.: WO2012/080631
PCT Pub. Date: Jun. 21, 2012

(65) Prior Publication Data
US 2013/0272400 A1    Oct. 17, 2013

(30) Foreign Application Priority Data
Dec. 15, 2010 (FR) ...................... 10 60570

(51) Int. Cl.
*H04N 7/32* (2006.01)
*H04N 19/50* (2014.01)
(Continued)

(52) U.S. Cl.
CPC ..... *H04N 19/00569* (2013.01); *H04N 19/105* (2014.11); *H04N 19/11* (2014.11);
(Continued)

(58) Field of Classification Search
CPC .. H04N 7/50; H04N 7/26244; H04N 7/26335; H04N 7/462; H04N 7/26941
See application file for complete search history.

(56) References Cited

U.S. PATENT DOCUMENTS

| 8,149,910 B2 * | 4/2012 | Tanizawa | H04N 19/176 375/240.12 |
|---|---|---|---|
| 8,842,731 B2 * | 9/2014 | Jung | H04N 7/34 375/240.12 |

(Continued)

FOREIGN PATENT DOCUMENTS

| EP | 1610563 A2 | 12/2005 |
|---|---|---|
| WO | 2009089032 A2 | 7/2009 |

OTHER PUBLICATIONS

Thiow Keng Tan et al.: "Intra Prediction by Template Matching", Image Processing, 2006 IEEE International Conference on, Oct. 8, 2006 (Oct. 11, 2006),-Oct. 11, 2006 (Oct. 11, 2006), pp. 1693-1696, XP002640873.*

(Continued)

*Primary Examiner* — Shawn An
(74) *Attorney, Agent, or Firm* — David D. Brush; Westman, Champlin & Koehler, P.A.

(57) ABSTRACT

A method is provided for decoding a signal that represents at least one image. The method implements at least one iteration of the following steps, for at least one block of the image to be decoded: determining at least one selection parameter from at least one characteristic associated with at least one reference pixel of a reference region of the image, the reference region including at least one previously encoded/decoded block and/or at least one pixel predicted in a preceding iteration; selecting at least one pixel to be predicted in the block to be decoded from the at least one selection parameter; and for at least one selected pixel to be (Continued)

predicted, referred to as an anchor pixel, predicting the anchor pixel from at least one reference pixel, thereby outputting a predicted pixel.

13 Claims, 3 Drawing Sheets

(51) Int. Cl.
| | |
|---|---|
| *H04N 19/105* | (2014.01) |
| *H04N 19/176* | (2014.01) |
| *H04N 19/60* | (2014.01) |
| *H04N 19/593* | (2014.01) |
| *H04N 19/11* | (2014.01) |
| *H04N 19/182* | (2014.01) |
| *H04N 19/192* | (2014.01) |

(52) U.S. Cl.
CPC ......... *H04N 19/176* (2014.11); *H04N 19/182* (2014.11); *H04N 19/192* (2014.11); *H04N 19/50* (2014.11); *H04N 19/593* (2014.11); *H04N 19/60* (2014.11)

(56) References Cited

U.S. PATENT DOCUMENTS

| | | | |
|---|---|---|---|
| 2005/0135481 A1* | 6/2005 | Sung | H04N 19/57 375/240.16 |
| 2006/0233251 A1* | 10/2006 | Kim | H04N 19/139 375/240.12 |
| 2007/0014362 A1* | 1/2007 | Cruz | H04N 19/513 375/240.16 |

OTHER PUBLICATIONS

Thiow Keng Tan et al.: "Intra Prediction by Template Matching", Image Processing, 2006 IEEE International Conference on, Oct. 8, 2006 (Oct. 8, 2006),-Oct. 11, 2006 (Oct. 11, 2006 ), pp. 1693-1696, XP002640873.*

International Preliminary Report on Patentability and English translation of the Written Opinion dated Jun. 18, 2013 for corresponding International Application No. PCT/FR2011/052928, filed Dec. 9, 2011.

French Search Report and Written Opinion dated Aug. 5, 2011 for corresponding French Application No. 1060570, filed Dec. 15, 2010.

International Search Report dated Mar. 1, 2012 for corresponding International Application No. PCT/FR2011/052928, filed Dec. 9, 2011.

Thiow Keng Tan et al.: "Intra Prediction by Template Matching", Image Processing, 2006 IEEE International Conference on, Oct. 8, 2006 (Oct. 8, 2006),-Oct. 11, 2006 (Oct. 11, 2006), pp. 1693-1696, XP002640873.

Johannes Balle et al.: "Extended Texture Prediction for H.264/AVC Intra Coding", Image Processing, 2006. ICIP 2007, IEEE International Conference on, IEEE, PI, Sep. 1, 2007 (Sep. 1, 2007), pp. VI-93-VI-96, XP031158270.

G. Laroches et al.: "Intra Prediction with 1D Macroblock Partitioning for Image and Video Coding", Visual Communications and Image Processing 2009, SPIE vol. 7257, 72570S, Jan. 2009, pp. 1-9.

* cited by examiner

METHODS AND DEVICES FOR ENCODING AND DECODING AT LEAST ONE IMAGE IMPLEMENTING A SELECTION OF PIXELS TO BE PREDICTED, AND CORRESPONDING COMPUTER PROGRAM

1. CROSS-REFERENCE TO RELATED APPLICATIONS

This Application is a Section 371 National Stage Application of International Application No. PCT/FR2011/052928, filed Dec. 9, 2011, which is incorporated by reference in its entirety and published as WO 2012/080631 on Jun. 21, 2012, not in English.

2. STATEMENT REGARDING FEDERALLY SPONSORED RESEARCH OR DEVELOPMENT

None.

3. THE NAMES OF PARTIES TO A JOINT RESEARCH AGREEMENT

None.

4. FIELD OF THE INVENTION

The field of the invention is that of the encoding and decoding of images or image sequences, specially video streams.

More specifically, the invention pertains to the compression of images or image sequences using a blockwise representation of images.

The invention can be applied especially to image or video encoding implemented in current or future encoders (JPEG, MPEG, H.264, HEVC, etc and their amendments), and to the corresponding decoding.

5. PRIOR ART

Digital images and image sequences occupy a great deal of space in terms of memory. These images therefore have to be compressed, when they are transmitted, in order to prevent problems of congestion on the network used for this transmission. Indeed, the usable bit rate on this network is generally limited.

Many video data compression techniques are already known. Among these techniques, the H.264 technique proposes to implement a prediction of pixels of a current image relatively to other pixels belonging to the same image (intra prediction) or belonging to a preceding or a following image (inter prediction).

More specifically, intra prediction makes use of spatial redundancies within an image. To this end, the images are sub-divided into macroblocks which can be sub-divided into blocks constituted by pixels. The (macro)blocks are then predicted by means of already rebuilt information, corresponding to the (macro)blocks previously encoded/decoded in the current image according to the order in which the (macro) blocks in the image are scanned. Thus, the images already rebuilt for a (macro)block being encoded according to the classic "raster scan" type scanning order (line by line) comprise pixels of the rows situated above the (macro)block being encoded and to pixels of the columns situated the left of the (macro)block being encoded.

Besides, classically, the encoding of a current block is done by means of a prediction of the current block, called a predicted block, and a prediction residue or "residual block" corresponding to a difference between the current block and the predicted block. The residual block obtained is then transformed, for example by using a DCT (discrete cosine transform) type transform. The coefficients of the transformed residual block are then quantified, and then encoded by an entropy encoding and transmitted to the decoder which can rebuild the current block by adding this residual block to the prediction.

The decoding is done image by image and, for each image, it is done (macro)block by (macro)block. For each (macro)block, the corresponding elements of the stream are read. Inverse quantification and inverse transform of the coefficients of the residual block or blocks associated with the (macro)block are performed. And then, the prediction of the (macro)block is computed and the (macro)block is rebuilt by adding the prediction to the decoded residual block or blocks.

One drawback of the intra prediction technique according to the H.264 technique is that the (macro)blocks are classically predicted from previously rebuilt pixels situated above the (macro)block being encoded and to the left of this (macro)block being encoded.

The prediction of the pixels of the current (macro)block located in areas distant from these previously rebuilt pixels, especially the prediction of the pixels located at the bottom right-hand of the current (macro)block, can prove to be difficult and costly for the transmission of the prediction residues.

Moreover, the intra prediction technique according to H.264 is limited to the prediction of (macro)blocks partitioned into blocks sized 16×16, 8×8 or 4×4. Now these partitions are not always suited, especially when the blocks have complex discontinuities.

These classic intra prediction schemes therefore encounter difficulties in the encoding of blocks having discontinuities, which cannot be modeled by square-shaped or rectangular partitions for example.

To overcome these drawbacks, a solution has been proposed by J. Jung et al. in: "*Intra prediction 1D macroblock partitioning for image and video coding*", VCIP, San Jose USA, January 2009.

This solution, also called a 1D intra solution, consists in partitioning the blocks of the (macro)block into "linear" partitions such as rows or columns which may be straight or broken and then predicting these rows or columns one by one. Once encoded, a row or column can be used to predict rows or columns to be encoded.

In this way, the quantity of pixels previously rebuilt increases as and when the operation is performed and the prediction of the remaining pixels is of the highest quality, and therefore less costly in terms of transmission of prediction residues.

Unfortunately, and as in the case of the intra prediction technique according to H.264, the linear partitions proposed are not always suited to the content of the blocks.

There is therefore a need for a novel technique of intra prediction, which can be used to improve prediction quality and therefore the compression of image or video data.

6. SUMMARY OF THE INVENTION

The invention proposes a novel solution which does not have all these drawbacks of the prior art, in the form of a method for decoding a signal representing at least one image.

According to the invention, such a method implements at least one iteration of the following steps, for at least one block of the image to be decoded:

determining at least one selection parameter, from at least one characteristic associated with at least one reference pixel of a reference region of the image, said reference region comprising at least one previously encoded/decoded block and/or at least one pixel predicted at a preceding iteration, selecting at least one pixel to be predicted in the block to be decoded, from said at least one selection parameter;

for at least one selected pixel to be predicted, called an anchor pixel, predicting the anchor pixel from at least one reference pixel of the reference region, delivering a predicted pixel.

The invention thus relies on a novel approach to the decoding of images, relying on a particular selection, at each iteration, of the pixels to be predicted in a block to be decoded.

More specifically, this particular selection of the pixels to be predicted is performed on the basis of at least one selection parameter determined in taking account of characteristics of pixels of a reference region (location of the reference pixels, prediction direction associated with these pixels, prediction residues associated with these pixels, etc).

Thus, the different pixels of the block to be decoded are scanned in a particular order, adapted to the content of the block, thus improving the efficiency of the intra prediction even in the presence of complex discontinuities.

In addition, the reference region comprises at least one previously encoded/decoded block and/or at least one pixel predicted at a preceding iteration. The iteration or iterations thus comprise a step for updating the reference region from the pixels predicted during the prediction step.

The number of previously predicted pixels and therefore the size of the reference region thus increase as and when the method is performed and therefore evolves during decoding. The prediction can thus be done from reference pixels closer to the pixels to be predicted, thus further improving the quality of the prediction.

In particular, the selection parameter or parameters belong to the group comprising:

a prediction starting point, corresponding to a pixel of the reference region to be used for the prediction of the anchor pixel;

a prediction direction for the prediction of the anchor pixel;

a prediction distance for the prediction of the anchor pixel.

It can be noted that these selection parameters can be used individually or in combination, during the step for selecting the pixels to be predicted. For example, the selection step takes account of the parameters of prediction starting point and prediction distance and/or prediction direction. Thus, all the pixels to be predicted, located at a certain prediction distance and/or prediction direction relative to the prediction starting point, are selected. According to another example, the selection step takes account solely of the parameter of prediction distance. Thus, all the pixels to be predicted, located at a certain distance from the reference pixels, are selected.

In particular, the step for determining takes account of the positions of the pixels predicted at least at one preceding iteration.

Thus, the invention takes account of the anchor pixels selected during the preceding iterations to determine the selection parameter or parameters and to select new pixels to be predicted.

According to a first embodiment, the step for determining determines at least one prediction starting point for the prediction of the anchor pixel or pixels.

The use of a selection parameter of the type prediction starting point ensures that the reference pixel used to predict the anchor pixel or pixels at the current iteration is a good predictor, which will therefore give a low prediction residue.

To this end, according to a first example, the step for determining implements the following steps:

determining a correlation between the pixels of at least one pair of reference pixels;

selecting the pair or pairs having a correlation above a predetermined threshold;

extracting a reference pixel from each of the selected pairs, corresponding to the prediction starting point or starting points.

According to a second example, the step for determining implements the following steps:

determining a prediction residue associated with at least one reference pixel;

selecting said reference pixel or pixels having a prediction residue lower than or equal to a predetermined threshold, corresponding to the prediction starting point or points.

In particular, the step for determining also takes account of a distance between the prediction starting points and/or a distribution of the prediction starting points in distinct zones of the block to be decoded.

In this way, a prediction starting point can be associated with each distinct zone or region of the block to be decoded.

According to a second embodiment, the step for determining determines at least one prediction direction for the prediction of the anchor pixel or pixels in taking account of a prediction starting point for the prediction of said anchor pixel or pixels.

The use of a selection parameter of the type prediction direction ensures a good prediction in the sense of the pattern or its contours, thus enabling the use of the relevant reference pixels to predict the anchor pixel or pixels at the current iteration.

To this end, in a first example, the step for determining implements the following steps:

determining a correlation between the pixels of at least one pair of reference pixels, a pair comprising the prediction starting point for the prediction of said anchor pixel or pixels, and a reference pixel neighboring the prediction starting point;

selecting the pair having a correlation higher than a predetermined threshold;

determining the prediction direction associated with said selected pair.

According to a second example, the step for determining takes account of the direction of the prediction starting point:

if a prediction starting point for the prediction of said anchor pixel or pixels belongs to a previously encoded/decoded block, the direction of the prediction mode used to predict the previously encoded/decoded block is assigned to said prediction direction;

if a prediction starting point for the prediction of the anchor pixel or pixels is a pixel predicted at a preceding iteration, the direction used to select the pixel predicted at the preceding iteration is assigned to the prediction direction.

In a third example, the step for determining takes account of the position of the prediction starting point. Thus, when the block to be decoded comprises at least two distinct zones, the step for determining determines at least one prediction direction as a function of the zone to which the prediction starting point belongs for the prediction of the anchor pixel or pixels.

According to a third embodiment, the step for determining determines at least one prediction distance for the prediction of the anchor pixel or pixels.

The use of a parameter for selecting a type of prediction distance enables an efficient distribution of the anchor pixels within the block to be decoded in order to facilitate the prediction, especially during the following iterations.

To this end, according to a first example, the step for determining determines at least one prediction distance from a prediction starting point and/or a prediction direction as a function of at least one prediction residue associated with at least one pixel predicted at a preceding iteration from the prediction starting point and/or the prediction direction.

According to a second example, the step for determining determines at least one prediction distance from a prediction starting point, according to a residue of prediction associated with the prediction starting point.

According to another aspect of the invention, the step for selecting implements the following sub-steps:
  pre-selecting at least one pixel to be predicted in the block to be decoded, from the selection parameter or parameters;
  assigning a weight to the pre-selected pixels to be predicted, taking account of the selection parameter or parameters used during the pre-selection;
  selecting pre-selected pixels to be predicted having a weight above a predetermined threshold.

In this way, it is possible to select anchor pixels that are solely the pixels to be predicted that have great weight, these pixels being considered to be the easiest to predict during the current iteration and being considered as the best predictors for the following iterations.

In another embodiment, the invention pertains to a device for decoding a signal representing at least one image.

According to the invention, such a device comprises the following means, activated in the form of at least one iteration for at least one block to be decoded of the image:
  means for determining at least one selection parameter, from at least one characteristic associated with at least one reference pixel of a reference region of the image, said reference region comprising at least one previously encoded/decoded block and at least one pixel predicted at a preceding iteration,
  means for selecting at least one pixel to be predicted in the block to be decoded, from said at least one selection parameter;
  for at least one selected pixel to be predicted, called an anchor pixel, means for predicting the anchor pixel from at least one reference pixel of the reference region, delivering a predicted pixel.

Such a decoding device is especially suited to implementing the decoding method described here above. It is for example a video decoder of the MPEG, HEVC or H.264 type, or according to any future compression standard.

This device could of course comprise the different characteristics of the decoding method according to the invention. Thus, the characteristics and advantages of this decoder are the same as those of the decoding method, and shall not be described in more ample detail.

Another aspect of the invention pertains to a method for encoding at least one image.

According to the invention, such a method implements at least one iteration of the following steps for at least one block to be encoded of the image:
  determining at least one selection parameter from at least one characteristic associated with at least one reference pixel of a reference region of the image, said reference region comprising at least one previously encoded/decoded block and/or at least one pixel predicted at a preceding iteration,
  selecting at least one pixel to be predicted in the block to be encoded, from said at least one selection parameter;
  for at least one selected pixel to be predicted, called an anchor pixel, predicting the anchor pixel from at least one reference pixel of the reference region, delivering a predicted pixel.

The invention thus proposes a novel approach to the encoding of images, relying on a particular selection, at each iteration, of the pixels to be predicted in a block to be encoded.

In particular, a method of this kind improves the efficiency of the intra encoding, especially for blocks difficult to predict. Since the prediction of the pixels is of better quality, this encoding technique is less costly in terms of transmission of prediction residues.

An encoding method of this kind is especially adapted to encoding a sequence of images intended for being decoded according to the decoding method described here above. In this way, steps are performed for determining, selecting and predicting similar to those described with reference to the method for decoding so as to scan the blocks to be encoded (when encoding) and to be decoded (when decoding) in the same scanning order.

The characteristics and advantages of this encoding method are the same as those described here above for the decoding method. They are therefore not described in more ample detail.

In another embodiment, the invention pertains to a device for encoding at least one image.

According to the invention, such a device comprises the following means, activated in the form of at least one iteration for at least one block to be encoded of the image:
  means for determining at least one selection parameter, from at least one characteristic associated with at least one reference pixel of a reference region of the image, said reference region comprising at least one previously encoded/decoded block and/or at least one pixel predicted at a preceding iteration,
  means for selecting at least one pixel to be predicted in the block to be encoded, from said at least one selection parameter;
  for at least one selected pixel to be predicted, called an anchor pixel, means for predicting the anchor pixel from at least one reference pixel of the reference region, delivering a predicted pixel.

An encoding device of this kind is especially adapted to implementing the encoding method described here above. It is for example an MPEG, HEVC or H.264 type video encoder or a video encoder according to a future compression standard.

This device could of course comprise the different characteristics pertaining to the encoding method according to the invention. Thus, the characteristics and advantages of this encoder are the same as those of the encoding method and are not described in more ample detail.

The invention also pertains to a computer program comprising instructions to implement a method of encoding and/or a method of decoding as described here above when this program is executed by a processor. Such a program can use any programming language whatsoever. It can be downloaded from a communications network and/or recorded on a computer-readable medium.

7. LIST OF FIGURES

Other features and advantages of the invention shall appear more clearly from the following description of a particular embodiment given by way of a simple, illustrative and non-exhaustive example and from the appended drawings, of which:

FIG. 1 illustrates the general principle of the method for encoding according to the invention;

FIG. 2 presents the main steps of the method for encoding according to one particular embodiment of the invention;

FIG. 3 presents three types of selection parameters considered according to the invention;

Figure 7:
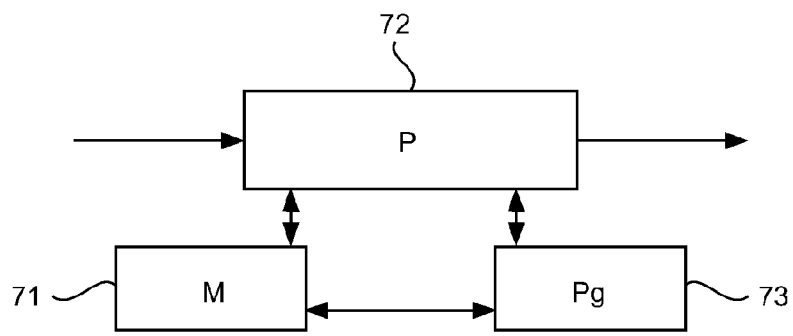
Figure 8:
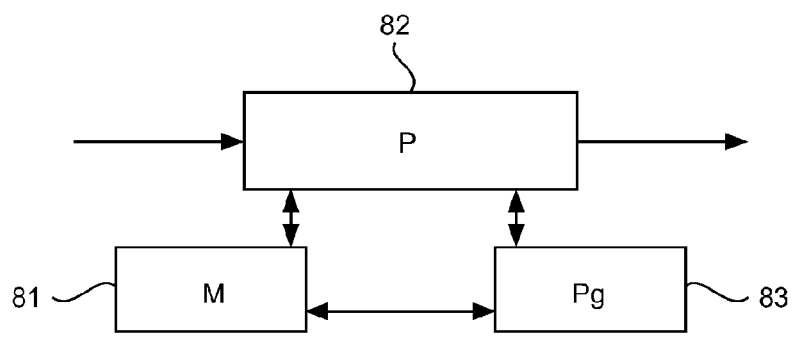

FIGS. 7 and 8 present the simplified structure of an encoder and a decoder according to one particular embodiment of the invention.

8. DESCRIPTION OF ONE EMBODIMENT OF THE INVENTION

8.1 General Principle

The general principle of the invention relies on an iterative prediction of at least one (macro)block to be encoded or decoded of an image, relying on a judicious selection of the pixels to be predicted at each iteration, known as anchor pixels.

In particular, these anchor pixels can be used to predict other pixels to be predicted during a following iteration. It is therefore sought, during a current iteration, to select pixels to be predicted which will be good predictors for a following iteration. Thus, the entire (macro)block is scanned in predicting a few pixels (anchor pixels) and transmitting the associated prediction residue at a current iteration, and using these anchor pixels to predict other pixels and to transmit the associated prediction residue at a following iteration.

In this way, the reference region comprising the previously encoded/decoded blocks and/or at least one pixel predicted at a preceding iteration can be updated at each iteration, in adding thereto the pixel or pixels predicted at the current iteration. The prediction of the pixels made at a following iteration is thereby improved, since the reference region is enriched by one or more anchor pixels.

A technique of this kind improves the efficiency of the intra encoding, especially for blocks difficult to predict by a classic encoding technique (such as the H.264 or Intra 1D techniques described with reference to the prior art), and especially for the blocks containing zones of varied texture.

8.2 Working of the Encoder

Figure 1:
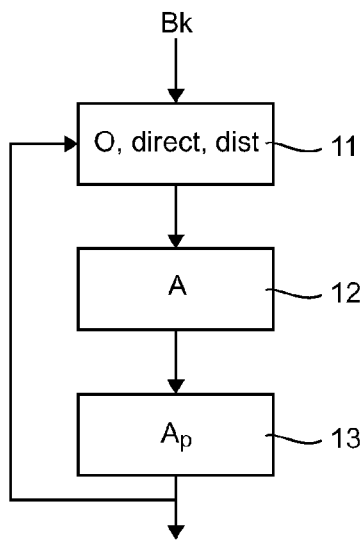

FIG. 1 illustrates the general principle of the encoding of at least one image according to the invention.

According to this general principle, at least one iteration is performed of the following steps for at least one block Bk to be encoded of the image:

determining 11 at least one selection parameter (O, direct., dist., etc) from at least one characteristic associated with at least one reference pixel of a reference region of the image (for example of the following type: location of the reference pixels, prediction direction associated with these pixels, prediction residues associated with these pixels, etc), said reference region comprising at least one previously encoded/decoded block and/or at least one pixel predicted at a preceding iteration, selecting 12 at least one pixel to be predicted in the block to be encoded Bk, from said at least one selection parameter;

for at least one selected pixel to be predicted, called an anchor pixel A, predicting 13 the anchor pixel from at least one reference pixel of the reference region, delivering a predicted pixel Ap.

These steps are iterated until each pixel of the block Bk to be encoded is processed.

It can be noted that, for the first iteration, the reference region comprises only pixels belonging to at least one previously encoded/decoded block. For the following iterations, the reference region also comprises the anchor pixels obtained at the preceding iterations.

Here below, referring to FIG. 2, a description is provided of the main steps for encoding at least one image according to one particular embodiment of the invention.

According to this embodiment, the image is considered to be divided into (macro)blocks, each (macro)block being itself divided into blocks of pixels.

The following steps 20 are then iterated so long as all the pixels of the current (macro)block MBc are not predicted. For the first iteration, the reference region Rref 21 comprises only previously encoded pixels, corresponding for example to the rows situated above the (macro)block to be encoded and to the columns situated to the left of the (macro)block to be encoded.

During the first step 22, the encoder first of all determines at least one selection parameter in taking account of characteristics of at least one pixel of the reference region Rref 21 and of selection rules, as described here below, and selects n pixels to be predicted in the (macro)block MBc, with n as an integer greater than or equal to 1.

The encoder then implements a prediction 23 of the n pixels to be predicted, called anchor pixels.

The prediction residues associated with these n anchor pixels are, if necessary, transformed and quantified during a step 24, for transmission 27 to the decoder.

The n anchor pixels are also used to update the reference region Rref. More specifically, the encoder applies an inverse quantification and an inverse transformation to the prediction residues associated with the n anchor pixels during a step 25. The anchor pixels thus encoded/decoded are added to the reference region during a step 26. The reference region therefore henceforth comprises the previously encoded pixels, corresponding to the rows situated above the (macro)block to be encoded and to the columns situated to the left of the (macro)block to be encoded, and the anchor pixels encoded/decoded at the current iteration.

The steps 22 to 26 are then reiterated so long as all the pixels of the (macro)block MBc are not predicted.

8.3 Determining Selection Parameters and Selecting Anchor Pixels

A) Selection Parameters

Here below, a more detailed description is provided of the steps for determining a selection parameter and for selecting n anchor pixels (steps referenced 11, 12, 22 in FIGS. 1 and 2).

More specifically, a pixel to be predicted can be selected as an anchor point from a combination of the following selection parameters:

- a prediction starting point corresponding to a pixel of the reference region to be used for the prediction of the anchor pixel;
- a prediction direction for the prediction of the anchor pixel;
- a prediction distance for the prediction of the anchor pixel.

Figure 3:
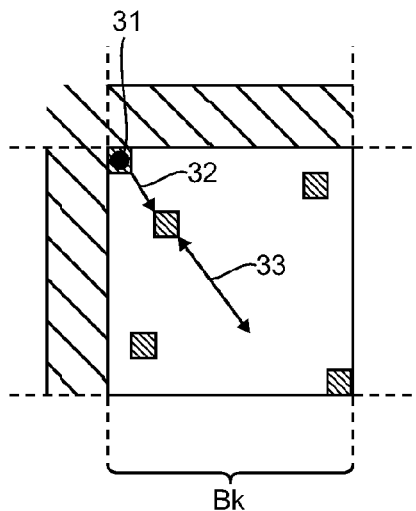

FIG. 3 more specifically illustrates these three selection parameters, for a block to be encoded Bk. It is considered for example that the reference region, hatched in FIG. 3, is formed by the previously encoded pixels corresponding to the rows situated above the block to be encoded and to the columns situated to the left of the block to be encoded and by five anchor pixels selected at a preceding iteration.

The prediction starting point 31 is represented by a circle and corresponds to a pixel of the reference region (hatched) to be used for the prediction of an anchor pixel at the current iteration.

The prediction direction 32 is represented by a one-way arrow.

The prediction distance 33 is represented by a two-way arrow.

Here below, we describe different techniques for determining these parameters, making it possible to ensure high-quality prediction of the pixels of the block Bk.

B) Prediction Starting Point

Several techniques can be implemented to determine a prediction starting point, these techniques enabling the selection of different anchor points.

Thus, in a first example, the step for determining determines at least one prediction starting point for the prediction of one or more anchor pixels from the following steps:

- determining a correlation between the pixels of at least one pair of pixels of the reference region;
- selecting the pair or pairs having a correlation higher than a predetermined threshold;
- extracting a reference pixel from each of the selected pairs, corresponding to the prediction starting point or starting points.

According to this first example, a prediction starting point is thus defined in taking account of the correlation between the pixels of sub-sets of pixels of the reference region. For example, the pixels of the reference region are compared two by two and, for each pair, the difference in absolute value between the two pixels of this pair is determined. The pair or pairs having the smallest difference or differences in absolute value, i.e. the highest correlation or correlations and therefore the best prediction or predictions are chosen. Thus, for each of these chosen pairs, a prediction starting point is obtained.

In a second example, the step for determining determines at least one prediction starting point for the prediction of one or more anchor pixels, on the basis of the following steps:

- determining a prediction residue associated with at least one reference pixel;
- selecting the reference pixel or pixels having a prediction residue smaller than or equal to a predetermined threshold, corresponding to the prediction starting point or starting points.

A prediction starting point at the current iteration is therefore determined by studying the prediction residues associated with the pixels of the reference region. This prediction residue can be determined at a preceding iteration or during the encoding of a neighboring block of the current block Bk.

In addition to these two examples, the determining of the prediction starting point can take account of one or more constraints, depending for example on a distance between the prediction starting points and/or a distribution of the prediction starting points in distinct zones of the block Bk.

Thus, the prediction starting points defined at each iteration must for example be spaced out from one another so as to ensure a uniform distribution of the anchor pixels in the block Bk.

According to another example, if the macroblock to which the block Bk belongs comprises several zones demarcated by contours, it is desirable to ensure an equitable distribution of the prediction starting points in the different zones. For example, a distinct prediction starting point is determined for each zone at each new iteration.

C) Prediction Direction

In the same way, several techniques can be implemented to determine a prediction direction, these techniques enabling the selection of different anchor points.

Thus, according to a first example, the step for determining determines at least one prediction direction for the prediction of one or more anchor pixels, from the following steps:

- correlation between the pixels of at least one pair of reference pixels, a pair comprising a prediction starting point for the prediction of the anchor pixel or pixels and a reference pixel neighboring the prediction starting point;
- selecting the pair presenting a correlation above a predetermined threshold;
- determining the prediction direction associated with the selected pair.

According to this first example, a prediction direction is thus defined in taking account of the correlation between a prediction starting point and the reference pixels neighboring this prediction starting point. For example, the prediction starting point is compared with each reference pixel (i.e. each pixel belonging to the reference region) neighboring this starting point, if these pixels exist and, for each pair, the difference between the two pixels of this pair is determined. The pair having the smallest difference (i.e. the highest correlation, and therefore the best prediction) is chosen. The prediction direction for the prediction of one or more anchor pixels corresponds to the prediction direction associated with the pair thus chosen.

The step for determining a prediction direction can also take account of a prediction starting point for the prediction of the anchor pixel or pixels.

Thus, according to a second example, the step for determining takes account of the direction of the prediction starting point:

- if a prediction starting point belongs to a previously encoded/decoded block, the prediction direction for the anchor pixel or pixels is defined by the direction of the mode of prediction (horizontal, vertical, etc) used to predict this previously encoded/decoded block;

if a prediction starting point is a pixel predicted at a preceding iteration, the prediction direction for the anchor pixel or pixels is defined by the direction used to select this pixel predicted at the preceding iteration.

According to a third example, the step for determining takes account of the position of the prediction starting point. Thus, if the block to be encoded comprises several zones demarcated by contours, the step for determining takes account of this zone to which the prediction starting point belongs for the predicting of the anchor pixel or pixels. Thus, a prediction direction is defined such that the prediction starting point and the corresponding anchor pixel belong to a same zone of the block. To this end, the direction is chosen for example to be parallel to the contour.

In addition to these three examples, the determining of the prediction direction can take account of one or more constraints, depending for example on the position of the anchor pixels obtained during preceding iterations.

For example, the directions which lead to already predicted anchor pixels must be avoided, in order to ensure an efficient distribution of the anchor pixels.

D) Prediction Distance

Again, several techniques can be implemented to determine a prediction distance.

Thus, according to a first example, the step for determining determines at least one prediction distance for the prediction of one or more anchor pixels, from a prediction starting point and/or a prediction direction, depending on at least one prediction residue associated with at least one pixel predicted at a preceding iteration from the prediction starting point and/or the prediction direction.

In other words, the prediction distance could be determined from the result of the preceding iterations, in taking account especially of the efficiency of the prediction of anchor pixels obtained at a preceding iteration with a same prediction starting point and/or prediction direction. This efficiency or quality of prediction is defined from the residues of prediction obtained after prediction. The order of scanning of the pixels in the block Bk is adapted in this way: the smaller the prediction residues (i.e. the prediction is of good quality), the greater can the prediction distance be.

In a second example, the step for determining determines at least one prediction distance to predict one or more anchor pixels from a prediction starting point, according to a prediction residue associated with the prediction starting point.

In other words, the prediction distance can be determined in taking account of the quality of the prediction starting point: if the prediction starting point is of good quality, i.e. if it has a low prediction residue, the prediction distance can be great. Conversely, if the prediction starting point is of lesser quality (higher prediction residue), a small prediction distance is defined, in order to limit the risks (there is a risk that the prediction of this new anchor pixel may be difficult and therefore costly in terms of size of prediction residue).

According to a third example, the step for determining determines at least one prediction distance in taking account of the proximity of the reference pixels relative to the pixels to be predicted.

In other words, the prediction distance is defined so as to obtain an optimum distribution of the anchor pixels in the block Bk. For example, the prediction distance is defined so as to comply with a same distance between all the anchor points, during an iteration. Thus a "perfect grid" is obtained at each iteration.

E) Selection of Anchor Pixels from the Selection Parameters

It is then possible to select one or more pixels to be predicted in the block Bk from a selection parameter or a combination of several selection parameters (possibly of the same type but determined according to different techniques).

For example, if only the selection parameter of the type prediction distance is used, then it is possible to select all the pixels to be predicted situated at a distance Dist1 from the reference pixels. If only the selection parameter of the type prediction direction is used, then it is possible to select all the pixels to be predicted situated in a direction Direct1 from the reference pixels. If selection parameters of the type prediction starting point and prediction distance are used, it is possible to select all the pixels to be predicted situated at a distance Dist2 from the starting point O. If selection parameters of the type prediction starting point and prediction direction are used, then it is possible to select all the pixels to be predicted situated in a direction Direct2 relative to the starting point O.

The use of a combination of selection parameters makes it possible especially to select a restricted number of anchor pixels for an iteration (for example a single anchor pixel) when the number of pixels to be predicted is far too great.

In particular, when several selection parameters are defined for an iteration, it is possible to assign a weight to the pixels to be predicted that are selected on the basis of these parameters according to the relevance of the selection.

For example, a higher degree of trust and therefore a greater weight is assigned to the pixels obtained from one or more selection parameters, for which the criterion used for the selection is the most relevant, and a lower degree of trust and therefore a smaller weight is assigned to the pixels obtained from one or more selection parameters, for which the criterion used for the selection is the second most relevant. The anchor pixels correspond then to pixels to be predicted having the greatest weights.

For example, we consider a step of pre-selection during which two sub-sets of pixels to be predicted are pre-selected:
  a first sub-set obtained from a prediction starting point O1 and a prediction direction D1;
  a second sub-set obtained from a prediction starting point O2 and a prediction direction D2.

For example, the starting points O1 and O2 are obtained by determining a correlation between the reference pixels, as described here above. The prediction starting point O1 is for example obtained from the pair having the highest correlation and the prediction starting point O2 is obtained from the pair having the second highest correlation.

A weight equal to 2 is then assigned to the pixels to be predicted of the first sub-set (obtained from the "best" prediction starting point) and a weight equal to 1 is assigned to the pixels to be predicted of the second sub-set (obtained from the "second best" prediction starting point). The pixels to be predicted which belong to the two sub-sets therefore have a weight equal to 3.

Then only the pixels to be predicted having the greatest weight, i.e. the pixels to be predicted having a weight equal to 3, are selected as anchor pixels.

Referring to FIGS. 4A to 4C and 5A and 5B, we now present the block Bk obtained at the end of several iterations of the encoding method according to two examples of implementation of the invention.

In these figures, the oblique hatches illustrate the reference region and the horizontal hatches illustrate the anchor pixels predicted at the current iteration.

Figure 4A:
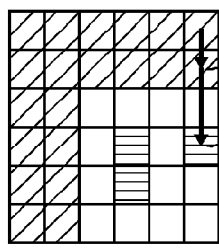
FIGS. 4A to 4C represent a block Bk to be encoded obtained at the end of different iterations according to a first example of an embodiment.

More specifically, FIG. 4A illustrates a first iteration of the encoding method according to a first example, making it possible especially to select the anchor pixel 41 from the three selection parameters, namely starting point, direction and distance.

More specifically, during this first iteration, the prediction starting point is determined from a correlation between the reference pixels. It makes it possible to determine the pixel referenced O, located at the top right-hand, as the prediction starting point (corresponding to the highest correlation between the reference pixels). The prediction direction is determined from a correlation between the starting point O and the reference pixels neighboring the starting point O. The vertical direction is the one corresponding to the greatest correlation between the starting point O and its neighboring reference pixels. The prediction distance is set at 2. From these three parameters (starting point O, vertical reference and distance equal to 2), the pixel to be predicted 41 is selected as the anchor pixel. The anchor pixels obtained during this iteration are integrated into the reference region for the future iterations.

Figure 4B:
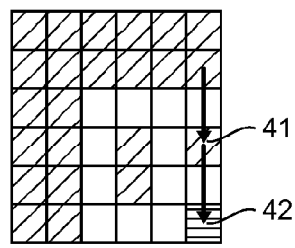

At the second iteration, illustrated in FIG. 4B, it is sought to select new pixels to be predicted by determining new selection parameters.

For example, the previously encoded anchor pixel 41 is determined as the prediction starting point. The vertical direction is again used because it corresponds to the greatest correlation between the anchor pixel 41 and the neighboring reference pixels. The prediction distance is again set at 2. From these three parameters, the pixel to be predicted 42 is selected as the new anchor pixel. For future iterations, the anchor pixel 42 is integrated into the reference region.

Figure 4C:
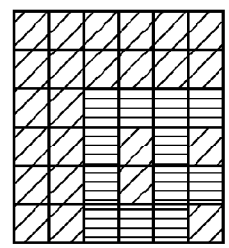

Finally, at the last iteration, illustrated in FIG. 4C, all the remaining pixels to be predicted are predicted. It is noted that these remaining pixels are all directly neighbors of at least one previously encoded reference pixel, thus ensuring the efficiency of the prediction.

Figure 5A:
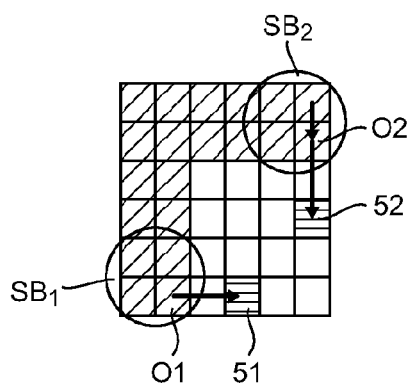
FIGS. 5A and 5B illustrate the block Bk to be encoded obtained at the end of the different iterations according to a second example of an embodiment.
Figure 5B:
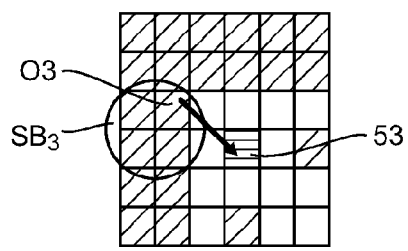

FIGS. 5A and 5B illustrate a second example of an embodiment with the determining of selection parameter of the type prediction direction, on the basis of the direction (horizontal, vertical, etc) of the mode of prediction used to predict the previously encoded/decoded blocks.

Thus, in FIG. 5A, illustrating a first iteration, two selection parameters of the type prediction starting point O1 and O2 are first of all determined. Indeed, the function of correlation between reference pixels in this example returns the same value for both these starting points.

Then, the direction of the prediction modes associated with the blocks to which these prediction starting points O1 and O2 belong is used to determine the selection parameters of the type prediction direction. For example, the sub-block SB1 to which the prediction starting point O1 belongs is considered to have been predicted in using a horizontal direction defining a first prediction direction which is horizontal, and the sub-block SB2 to which the prediction starting point O2 belongs is considered to have been predicted in using the vertical direction, defining a second prediction direction which is vertical.

Finally, a selection parameter of the type prediction distance is considered to be set at 2.

From these first three parameters (starting point O1, horizontal direction and distance equal to 2), a first pixel to be predicted 51 is selected as an anchor pixel. From the three other parameters (starting point O2, vertical direction and distance equal to 2), a second pixel to be predicted 52 is selected as an anchor pixel. The anchor pixels obtained during this iteration are integrated into the reference region for future iterations.

During the second iteration, illustrated in FIG. 5B, the function of correlation between reference pixels is used to determine a single starting point pixel O3.

Then, the direction of the prediction mode associated with the sub-block SB3 to which the prediction starting point O3 belongs is used to determine the selection parameter of the type prediction direction, herein corresponding to the diagonal direction.

Finally, we again consider a selection parameter of the type prediction distance set at 2.

From the three parameters (starting point O3, diagonal direction and distance equal to 2), a new pixel to be predicted 53 is selected as an anchor pixel.

According to other examples (not shown), it is possible to select a predetermined number of pixels to be predicted at each iteration (for example n pixels). It is also possible to select all the pixels for which the selection parameters are determined by functions returning a value that is higher (or lower) than a predetermined threshold. For example, all the reference pixels for which the prediction residue is below a predetermined threshold are determined as prediction starting points.

According to the invention, the order of scanning the pixels of the block is thus adapted to the content of the block. It is thus possible to predict the "simplest" pixels during the first iterations and the most "complex" pixels (comprising for example contours) during the last iterations. Since the reference region is updated with anchor pixels as and when the iterations are performed, the prediction of the most complex pixels, implemented during the last iterations, is thus done from a reference region that covers a large part of the block Bk and is therefore closer to the last pixels to be predicted. The prediction of these pixels is therefore of better quality.

Classically, only the prediction residues are then transmitted to the decoder, possibly after transformation and quantification. Since the prediction according to the invention is of better quality, these prediction residues are less costly. We therefore obtain a compression gain.

8.4 Working of the Decoder

Figure 2:
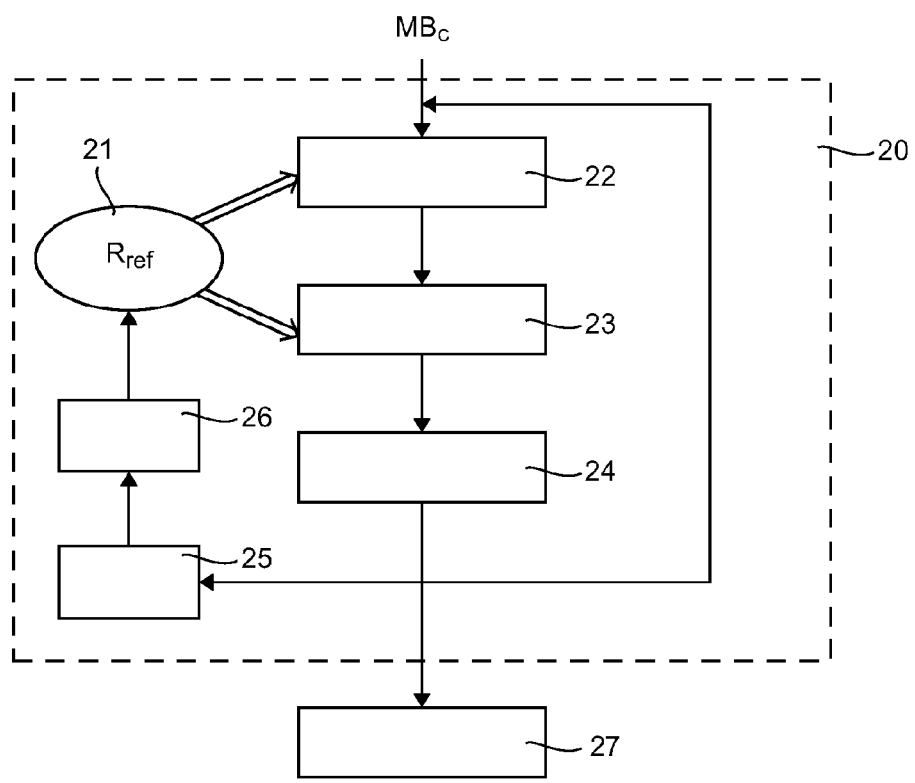

For the decoding of at least one image encoded according to the encoding method illustrated in FIGS. 1 and 2, the decoder implements steps similar to those implemented when encoding. In this way, it reselects anchor pixels as done when encoding.

Figure 6:
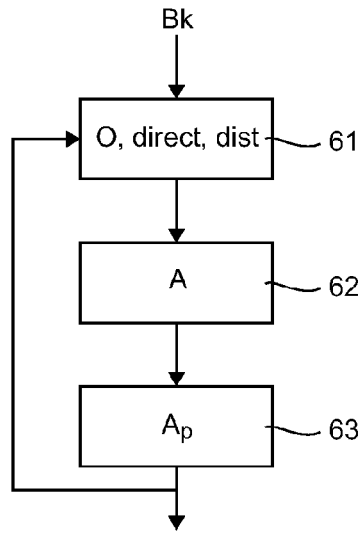
FIG. 6 illustrates the general principle of the method for decoding according to the invention.

More specifically, as illustrated in FIG. 6, the decoder performs at least one iteration of the following steps for at least one block to be decoded Bk of the image:

determining 61 at least one selection parameter (O, direction, distance, etc) from at least one characteristic associated with at least one reference pixel of a reference region of the image, said reference region comprising at least one previously encoded/decoded block and at least one pixel predicted at a preceding iteration, selecting 62 at least one pixel to be predicted in the block to be decoded Bk from said at least one selection parameter;

for at least one selected pixel to be predicted, called an anchor pixel A, predicting 63 the anchor pixel from said at least one reference pixel, delivering a predicted pixel Ap.

These steps are iterated until each pixel of the block to be decoded Bk is processed.

As in the case of the encoding, it is noted that, for the first iteration, the reference region comprises only pixels belonging to at least one previously encoded/decoded block. For the following iterations, the reference region also comprises the anchor pixels obtained at the preceding iterations.

These steps are similar to those described for the encoding and are therefore not presented herein in greater detail.

8.5 Structure of the Encoder and the Decoder

Finally, referring to FIGS. 7 and 8, we present the simplified structures of an encoder and a decoder respectively implementing a technique of encoding and a technique of decoding according to one of the embodiments described here above.

For example, the encoder comprises a memory 71 comprising a buffer memory, a processing unit 72 equipped for example with a microprocessor μP, and driven by the computer program 73, implementing the method of encoding according to the invention.

At initialization, the code instructions of the computer program 73 are for example loaded into a RAM and then executed by the processor of the processing unit 72. The processing unit 72 inputs at least one image to be encoded. The microprocessor of the processing unit 72 implements the steps of the encoding method described here above, according to the instructions of the computer program 73, to encode at least one block of the image. To this end, the encoder comprises, in addition to the buffer memory 71, means for determining at least one selection parameter, means for selecting at least one pixel to be predicted in the block to be encoded, and means for predicting at least one anchor pixel. These means are driven by the microprocessor of the processing unit 72.

The decoder comprises, for its part, a memory 81 comprising a buffer memory, a processing unit 82 equipped for example with a microprocessor μP, and driven by the computer program 83, implementing the method of decoding according to the invention.

At initialization, the code instructions of the computer program 83 are for example loaded into a RAM and then executed by the processor of the processing unit 82. The processing unit 82 inputs a signal representing at least one image. The microprocessor of the processing unit 82 implements the steps of the decoding method described here above, according to the instructions of the computer program 83, to decode at least one block of the image. To this end, the decoder comprises, in addition to the buffer memory 81, means for determining at least one selection parameter, means for selecting at least one pixel to be predicted in the block to be decoded, and means for predicting at least one anchor pixel. These means are driven by the microprocessor of the processing unit 82.

The invention claimed is:

1. A method for decoding a signal representing at least one image, comprising:
    implementing at least one iteration of the following acts, for at least one block to be decoded of said image:
    determining with a decoding device at least one selection parameter, from at least one characteristic associated with at least one reference pixel of a reference region of said image, said reference region comprising at least one previously encoded/decoded block and/or at least one pixel predicted at a preceding iteration,
    selecting with the decoding device at least one pixel to be predicted in said block to be decoded, from said at least one selection parameter; and
    for at least one selected pixel to be predicted, called an anchor pixel, predicting with the decoding device said anchor pixel from at least one reference pixel of said reference region, delivering a predicted pixel,
    wherein said determining determines at least one prediction starting point for the prediction of said anchor pixel or pixels, from the following acts:
    determining a prediction residue associated with at least one reference pixel; and
    selecting said at least one reference pixel having a prediction residue lower than or equal to a predetermined threshold, corresponding to said at least one prediction starting point.

2. The method for decoding according to claim 1, wherein said at least one selection parameter belongs to the group consisting of:
    a prediction starting point, corresponding to a pixel of the reference region to be used for the prediction of said anchor pixel;
    a prediction direction for the prediction of said anchor pixel;
    a prediction distance for the prediction of said anchor pixel.

3. The method for decoding according to claim 1, wherein said determining takes account of positions of the pixels predicted at least at one preceding iteration.

4. The method for decoding according to claim 1, wherein said determining determines at least one prediction direction for the prediction of said anchor pixel or pixels in taking account of at least one prediction starting point for the prediction of said anchor pixel or pixels.

5. The method for decoding according to claim 4, wherein said determining implements the following:
    determining a correlation between the pixels of at least one pair of reference pixels, a pair comprising said prediction starting point for the prediction of said anchor pixel or pixels, and a reference pixel neighboring said prediction starting point;
    selecting the pair having a correlation higher than a predetermined threshold;
    determining the prediction direction associated with said selected pair.

6. The method for decoding according to claim 1, wherein said determining determines at least one prediction distance for the prediction of said anchor pixel or pixels from at least one prediction starting point and/or at least one prediction direction, as a function of at least one prediction residue associated with at least one pixel predicted at a preceding iteration from said at least one prediction starting point and/or said at least one prediction direction.

7. The method for decoding according to claim 1, wherein said determining determines at least one prediction distance for the prediction of said anchor pixel or pixels from at least one prediction starting point as a function of a prediction residue associated with said at least one prediction starting point.

8. The method for decoding according to claim 1, wherein said selecting implements the following:
    pre-selecting at least one pixel to be predicted in said block to be decoded, from said selection parameter or parameters;
    assigning a weight to the pre-selected pixels to be predicted, taking account of said selection parameter or parameters used during said pre-selecting;
    selecting pre-selected pixels to be predicted having a weight above a predetermined threshold.

9. The method for decoding according to claim 1, wherein said at least one iteration comprises updating said reference region from the pixels predicted during said predicting.

10. A method for encoding at least one image, comprising:
implementing an iteration of the following acts for at least one block to be encoded of said image:
- determining with an encoding device at least one selection parameter from at least one characteristic associated with at least one reference pixel of a reference region of said image, said reference region comprising at least one previously encoded/decoded block and/or at least one pixel predicted at a preceding iteration,
- selecting with the encoding device at least one pixel to be predicted in said block to be encoded, from said at least one selection parameter; and
- for at least one selected pixel to be predicted, called an anchor pixel, predicting with the encoding device said anchor pixel from at least one reference pixel of said reference region, delivering a predicted pixel,
- wherein said determining determines at least one prediction starting point for the prediction of said anchor pixel or pixels, from the following acts:
- determining a prediction residue associated with at least one reference pixel; and
- selecting said at least one reference pixel having a prediction residue lower than or equal to a predetermined threshold, corresponding to said at least one prediction starting point.

11. A device for decoding a signal representing at least one image, comprising:
- a non-transitory computer-readable medium comprising computer readable instructions stored thereon; and
- a processing unit configured by the computer readable instructions to perform acts comprising:
- implementing at least one iteration of the following acts for at least one block to be decoded of said image:
- determining at least one selection parameter, from at least one characteristic associated with at least one reference pixel of a reference region of said image, said reference region comprising at least one previously encoded/decoded block and/or at least one pixel predicted at a preceding iteration,
- selecting at least one pixel to be predicted in said block to be decoded, from said at least one selection parameter; and
- for at least one selected pixel to be predicted, called an anchor pixel, predicting the anchor pixel from at least one reference pixel of said reference region, delivering a predicted pixel,
- wherein said determining determines at least one prediction starting point for the prediction of said anchor pixel or pixels, comprising:
- determining a prediction residue associated with at least one reference pixel; and
- selecting said at least one reference pixel having a prediction residue lower than or equal to a predetermined threshold, corresponding to said at least one prediction starting point.

12. A device for encoding at least one image, comprising:
- a non-transitory computer-readable medium comprising computer readable instructions stored thereon; and
- a processing unit configured by the computer readable instructions to perform acts comprising:
- implementing at least one iteration of the following acts for at least one block to be encoded of said image:
- determining at least one selection parameter, from at least one characteristic associated with at least one reference pixel of a reference region of said image, said reference region comprising at least one previously encoded/decoded block and/or at least one pixel predicted at a preceding iteration,
- selecting at least one pixel to be predicted in said block to be encoded, from said at least one selection parameter; and
- for at least one selected pixel to be predicted, called an anchor pixel, predicting said anchor pixel from at least one reference pixel of said reference region, delivering a predicted pixel,
- wherein said determining determines at least one prediction starting point for the prediction of said anchor pixel or pixels, comprising:
- determining a prediction residue associated with at least one reference pixel; and
- selecting said at least one reference pixel having a prediction residue lower than or equal to a predetermined threshold, corresponding to said at least one prediction starting point.

13. A non-transitory computer-readable medium comprising a computer program stored thereon and comprising computer-executable instructions to implement a method for decoding or encoding a signal representing at least one image, when this computer program is executed by a processor, wherein the computer-executable instructions comprise:
- instructions that configure the processor to implement at least one iteration of the following acts, for at least one block to be decoded of said image:
- determining at least one selection parameter, from at least one characteristic associated with at least one reference pixel of a reference region of said image, said reference region comprising at least one previously encoded/decoded block and/or at least one pixel predicted at a preceding iteration,
- selecting at least one pixel to be predicted in said block to be decoded, from said at least one selection parameter; and
- for at least one selected pixel to be predicted, called an anchor pixel, predicting said anchor pixel from at least one reference pixel of said reference region, delivering a predicted pixel,
- wherein said determining determines at least one prediction starting point for the prediction of said anchor pixel or pixels, from the following acts:
- determining a prediction residue associated with at least one reference pixel; and
- selecting said at least one reference pixel having a prediction residue lower than or equal to a predetermined threshold, corresponding to said at least one prediction starting point.

* * * * *